United States Patent

Takahashi et al.

Patent Number: 5,041,466
Date of Patent: Aug. 20, 1991

[54] METHOD FOR THE PREPARATION OF FOAMED AND CURED SILICONE RUBBER BODY

[75] Inventors: Masaharu Takahashi, Gunma; Jun Hatakeyama, Ibaraki, both of Japan

[73] Assignee: Shin-Etsu Chemical Co., Ltd., Tokyo, Japan

[21] Appl. No.: 583,274

[22] Filed: Sep. 17, 1990

[30] Foreign Application Priority Data

Sep. 19, 1989 [JP] Japan ................................. 1-243020

[51] Int. Cl.$^5$ ............................................. C08J 9/10
[52] U.S. Cl. .......................................... 521/91; 521/92; 521/95; 521/154; 521/96; 521/915
[58] Field of Search ................... 521/91, 92, 96, 154, 521/915, 95

[56] References Cited

U.S. PATENT DOCUMENTS

| | | | |
|---|---|---|---|
| 4,391,765 | 7/1983 | Lee et al. | 521/65 |
| 4,460,713 | 7/1984 | Lee et al. | 521/154 |
| 4,555,529 | 11/1985 | Lee et al. | 521/154 |
| 4,572,917 | 2/1986 | Graiver et al. | 521/154 |

*Primary Examiner*—Morton Foelak
*Attorney, Agent, or Firm*—Millen, White & Zelano

[57] ABSTRACT

An efficient method for the preparation of a foamed and cured silicone rubber body having a uniform fine-cellular structure, in which a foamable silicone rubber composition is prepared by uniformly compounding a diorganopolysiloxane, finely divided silica filler, titanium dioxide powder, blowing agent and curing agent, each in a specified weight proportion, and irradiating the thus prepared composition with microwaves having a frequency of 900 to 5000 MHz which, by virtue of the titanium dioxide powder having a high dielectric constant, are efficiently absorbed and converted to heat, whereby the composition is evenly heated throughout the body to cause uniform foaming and curing.

12 Claims, No Drawings

METHOD FOR THE PREPARATION OF FOAMED AND CURED SILICONE RUBBER BODY

BACKGROUND OF THE INVENTION

The present invention relates to a method for the preparation of a foamed and cured silicone rubber body, more particularly, to an efficient method for the preparation of a foamed and cured silicone rubber body having a very uniform and dense cellular structure.

As is well known, silicone rubber compositions are cured into various cured silicone rubber bodies by different curing methods depending on the types of the silicone rubber composition and the desired form of the silicone rubber articles. When a continuous-length body of a cured silicone rubber composition is desired, for example, the uncured silicone rubber composition is extrusion-molded into a continuous-length body, such as tubes, sheets and the like, which is then cured or vulcanized by the method of normal-pressure hot-air vulcanization, continuous steaming vulcanization, molten-salt vulcanization or the like. Although these conventional methods are useful when the desired cured silicone rubber body has a solid or non-cellular structure, none of them is applicable to the preparation of a continuous-length body of a cured silicone rubber having a foamed or cellular structure with uniform and dense distribution of fine cells.

Apart from silicone rubbers, the demand for foamed and cured rubber bodies produced, in particular, in a continuous-length form is rapidly growing in recent years in various applications such as gaskets and heat- and sound-insulators in buildings, rubber rollers in office machines and the like. In this regard, an efficient method has been developed for the preparation of a cured and foamed body of various organic rubbers in general in a continuous-length form, in which a curable and foamable composition of a rubber such as ethylene-propylene-diene copolymeric rubbers, polychloroprene rubbers and the like is extrusion-molded into a continuous-length form which is then subjected to irradiation with ultrahigh-frequency electromagnetic waves or microwaves to generate a sufficient quantity of heat in the body of the rubber composition as extruded so that the rubber composition is foamed and cured into a cured and foamed rubber body.

This method of rubber-vulcanization by the ultrahigh-frequency irradiation, referred to as the UHFV method hereinafter, however, is not applicable to the preparation of a cured and foamed silicone rubber body of a continuous length due to the loss index of silicone rubber compositions in general is so small an insufficient quantity of heat is generated. More specifically, the UHFV method is performed by exposing a shaped body of an uncured rubber composition to the field of electromagnetic waves at a frequency of 2450±50 MHz or 915±25 MHz according to the regulation so that the rubber body absorbs the energy of the electromagnetic waves to generate heat by which the crosslinking reaction proceeds in the rubber body to give a cured rubber body. When a rubber body in a microwave-heating oven is irradiated with microwaves, the rate of energy absorption by the rubber body P in watts/m$^3$ is given by the equation:

$$P = (5/9) f \cdot E^2 \cdot \epsilon \cdot \tan \delta \times 10^{10},$$

in which
f is the frequency of the microwaves in hertz (Hz);
E is the high-frequency electric field in volts/meter;
$\epsilon$ is the relative dielectric constant of the rubber; and
tan $\epsilon$ is the dielectric loss factor of the rubber.

The value of $\epsilon \cdot \tan \delta$ is usually called the loss index of the material and it is generally understood that the UHFV method is applicable only to a rubber composition having the loss index of at least 0.08 or, preferably, at least 0.2. Silicone rubber compositions in general have a much smaller loss index of only about 0.03 at a frequency of 3000 MHz than most of other organic rubber compositions. This is the principal reason for the general understanding that the UHFV method is hardly applicable to silicone rubber compositions.

In view of the above mentioned problem relative to the applicability of the UHFV method to silicone rubber compositions, a proposal has been made in Japanese Patent Kokai 52-37963 with an object to improve the efficiency of the UHFV method for silicone rubber compositions, according to which at least 5% by moles fraction of the organic groups bonded to the silicone atoms in the organopolysiloxane as the major constituent of the silicone rubber composition are selected from the class consisting of aryl groups, chlorinated aliphatic hydrocarbon groups, fluorinated aliphatic hydrocarbon groups, hydrocarbon groups having at least one mercapto group bonded to the carbon atom, hydrocarbon groups having at least one methylol group and alkoxyalkyl groups. A problem in the use of such a modified organopolysiloxane as the constituent of a silicone rubber composition is that the cured silicone rubber articles prepared from the composition are not always quite satisfactory from the practical standpoint in respect of the heat resistance, weatherability, electric properties and surface properties.

SUMMARY OF THE INVENTION

The present invention accordingly has an object to provide a novel and efficient method for the preparation of a foamed and cured silicone rubber body having a very uniform and dense cellular structure of fine cells by utilizing the UHFV method.

The method of the present invention for the preparation of a foamed and cured silicone rubber body comprises the steps of:

(A) compounding, into a uniform composition,
  (a) 100 parts by weight of a diorganopolysiloxane represented by the average unit formula $$R_a SiO_{(4-a)/2}, \qquad (I)$$

in which R denotes an unsubstituted or substituted monovalent hydrocarbon group and the subscript a is a positive number in the range from 1.95 to 2.05, and having an average degree of polymerization in the range from 3,000 to 30,000,
  (b) from 10 to 300 parts by weight of a finely divided silica filler;
  (c) from 5 to 200 parts by weight of a powder of titanium dioxide having an average particle diameter not exceeding 30 μm;
  (d) from 1 to 20 parts by weight of a blowing agent; and
  (e) a curing agent in an amount sufficient to cure the composition; and (B) irradiating the composition prepared in step (A) above with microwaves at a frequency in the range from 900 to 5000 MHz.

DETAILED DESCRIPTION OF THE PREFERRED EMBODIMENTS

As is described above, the foamable silicone rubber composition prepared in step (A) and irradiated with microwaves in step (B) comprises the essential components (a) to (e). This unique formulation of the composition established as a result of the extensive investigations by the inventors is characterized by the combined use of a titanium dioxide powder with a finely divided silica filler. As a consequence, the inventive silicone rubber composition can be efficiently cured by the UHFV method so that a continuous-length body of a cured and foamed silicone rubber can be easily prepared by continuous extrusion molding of the composition followed by curing by the UHFV method. In the following, detailed description is given for each of these essential components.

The component (a) in the silicone rubber composition prepared in step (A) is a diorganopolysiloxane represented by the above given average unit formula (I). In the formula, the symbol R denotes an unsubstituted or substituted monovalent hydrocarbon group having, preferably, 1 to 8 carbon atoms as exemplified by alkyl groups, e.g., methyl, ethyl, propyl and butyl groups, alkenyl groups, e.g., vinyl, allyl and butenyl groups, and aryl groups, e.g., phenyl and tolyl groups, as well as those substituted groups obtained by replacing a part or all of the hydrogen atoms in the above named hydrocarbon groups with halogen atoms, cyano groups and the like, e.g., chloromethyl, chloropropyl, 3,3,3-trifluoropropyl and 2-cyanoethyl groups. The groups denoted by R in a molecule of the diorganopolysiloxane need not all be the same but can be a combination of two kinds or more of the above named different groups according to need. It is, however, preferable that at least 98% by moles of the groups denoted by R are selected from alkyl groups having 1 to 4 carbon atoms and in particular, are methyl groups, the remainder, if any, being vinyl groups, phenyl groups, 3,3,3-trifluoropropyl groups and the like. It is preferable that the diorganopolysiloxane as the component (a) has a substantially linear molecular structure although no particular adverse influences are caused by a small number of branches on the linear molecules. The diorganopolysiloxane should have an average degree of polymerization in the range from 3,000 to 30,000 or, preferably, from 4,000 to 10,000 in view of the balance between the workability of the composition and the properties of the silicone rubber obtained by curing the composition. In this regard, the subscript a in the average unit formula (I) should be a number in the range from 1.95 to 2.05 or, preferably, from 1.98 to 2.03. When the value of a is too small, difficulties are encountered in the compounding work of the composition due to a decrease in the flowability of the diorganopolysiloxane. A value for subscript a larger than the above mentioned upper limit means that the average degree of polymerization of the diorganopolysiloxane is too small to impart high mechanical properties to the cured silicone rubber.

The component (b) in the silicone rubber composition is a finely divided silica filler which is well known as an ingredient in silicone rubber compositions to achieve a reinforcing effect or is compounded therein with an object of consistency control of the composition, improvement of workability, bulking of the composition and so on. Types of the finely divided silica filler includes so-called fumed and precipitated silica fillers either with or without hydrophobilizing treatment of the surface, finely pulverized quartz powder, diatomaceous earth and the like. It is preferable that the finely divided silica filler has a specific surface area of at least 50 $m^2/g$ in order to fully exhibit the reinforcing effect. The amount of the finely divided silica filler employed as component (b), which is compounded with diorganopolysiloxane as the component (a), is in the range from 10 to 300 parts by weight or, preferably, from 50 to 200 parts by weight per 100 parts by weight of component (a). When the amount of component (b) is too small, the desired reinforcing effect cannot be obtained and the rubber composition has a consistency not suitable for processing as a rubber. If the amount of component (b) is too large, great difficulty would be encountered in compounding the large amount of the filler with other ingredients of the composition as well as adversely affecting the moldability of the composition if it could be obtained.

It is optional that the silicone rubber composition contains, besides the above described finely divided silica filler, various kinds of other fillers according to need including calcium silicate, calcium carbonate, carbon black, glass fibers and the like in a limited amount.

The component (c) comprised in the foamable silicone rubber composition prepared in step (A) is a titanium dioxide powder which serves to efficiently absorb the energy of the microwaves so that an increased quantity of heat could be generated in the composition when it is irradiated with microwaves. Titanium dioxide powders of several different types are commercially available including fumed titanium dioxide prepared by a dry process and precipitated titanium dioxide prepared by a wet process. A titanium dioxide powder can be crystalline or amorphous and the crystalline titaniun dioxide powders include those having a crystalline structures of rutile and anatase. The titanium dioxide powder employed as component (c) in the composition preferably is a crystalline titanium dioxide powder in respect of the absorptivity of the energy of microwaves. The titanium dioxide powder should have an average particle diameter not exceeding 30 $\mu m$ or, preferably, in the range from 0.1 to 10 $\mu m$. If the titanium dioxide powder compounded in the composition in step (A) is too coarse, the foamed and cured silicone rubber body prepared from the composition would have a disadvantageously low mechanical strength. The amount of the titanium dioxide powder as component (c) compounded in the inventive silicone rubber composition is in the range from 5 to 200 parts by weight or, preferably, from 20 to 100 parts by weight per 100 parts by weight of component (a). If amount of the component (c) is too small, the quantity of heat generated in the composition by the microwave irradiation would be too small to fully cure the composition. If the amount thereof is too large, on the other hand, the foamed and cured silicone rubber body prepared from the composition would have a greatly decreased mechanical strength. Among various inorganic powders having a relatively large dielectric constant capable of efficiently absorbing the microwave energy, titanium dioxide is particularly advantageous in respect of absence of any retarding effect on the curing reaction of silicone rubbers with an organic peroxide and aesthetically acceptable beautiful white color as well as versatility of coloring in any desired color.

The component (d) compounded in the foamable silicone rubber composition prepared in step (A) is a blowing agent which is stable at room temperature but is thermally decomposed and produces a foaming gas, such as nitrogen, carbon dioxide and the like, in the rubber composition when the composition is heated to expand the composition into a cellular body. Various kinds of organic compounds are known as a blowing agent of rubber compositions and can be used in the invention without particular limitations. Examples of suitable blowing agents include azobisisobutyronitrile, dinitroso pentamethylene tetramine, benzene sulfone hydrazide, N,N'-dinitroso-N,N'-dimethyl terephthalamide, azodicarbonamide and the like. The amount of blowing agent as the component (d) compounded in the silicone rubber composition is in the range from 1 to 10 parts by weight or, preferably, from 3 to 7 parts by weight per 100 parts by weight of the diorganopolysiloxane as component (a). When the amount thereof is too small, fully developed cellular structure of the cured silicone rubber body can hardly be obtained due to the deficiency in the volume of the foaming gas produced therefrom. When the amount thereof is too large, on the other hand, the workability of the rubber composition may be somewhat decreased in adition to the problem that the cellular structure of the foamed and cured silicone rubber body would be too coarse, not to mention the economical disadvantage due to the increase in the costs.

The component (e) compounded in the foamable silicone rubber composition prepared in step (A) is a curing agent which crosslinks the molecules of the diorganopolysiloxane as the component (a) to cure the composition. Any known curing agent conventionally used in silicone rubber compositions can be used here including, typically, organic peroxides. A combination of an organohydrogenpolysiloxane and a catalytic amount of a platinum compound can also serve as a curing agent, in particular, when some of the groups denoted by R in the average unit formula (I) representing the diorganopolysiloxane as component (a) are alkenyl groups or, preferably, vinyl groups by pertaining to the so-called hydrosilation reaction between the silicon-bonded vinyl groups and the silicon-bonded hydrogen atoms.

Examples of the organic peroxide suitable as the curing agent include benzoyl peroxide, monochlorobenzoyl peroxide, p-methyl benzoyl peroxide, 2,4-dichlorobenzoyl peroxide, tert-butyl perbenzoate, dicumyl peroxide, 2,5-bis(tert-butylperoxy)-2,5-dimethyl hexane and the like. These organic peroxide compounds can be used either singly or as a combination of two kinds or more according to need. The amount of the organic peroxide as the curing agent in the foamable silicone rubber composition should be sufficient to fully cure the composition when it is heated by the microwave irradiation. Usually, the amount is in the range from 0.5 to 5 parts by weight or, preferably, from 0.5 to 3 parts by weight per 100 parts by weight of the diorganopolysiloxane as component (a). When the amount of the organic peroxide is too small, high mechanical strengths is not imparted to the foamed and cured silicone rubber body which may be readily collapsible. If the amount thereof is too large, on the other hand, the foamed and cured silicone rubber body would be too rigid sometimes with brittleness due to the unduly high crosslinking density.

As is mentioned above, the mechanism of hydrosilation or so-called addition reaction is applicable to the curing of the silicone rubber composition when the diorganopolysiloxane as component (a) has at least two silicon-bonded alkenyl or vinyl groups per molecule by using a combination of an organohydrogenpolysiloxane as a crosslinking agent and a platinum compound as a catalyst. Examples of suitable platinum catalysts include chloroplatinic acid, preferably, in the form of an alcohol solution, complexes of chloroplatinic acid with an olefin or a vinylsiloxane, and the like. The amount of the platinum compound compounded in the inventive composition is usually in the range from 0.5 to 500 ppm by weight or, preferably, from 2 to 200 ppm by weight calculated as platinum per 100 parts by weight of the component (a).

The organohydrogenpolysiloxane used as a crosslinking agent of the vinyl-containing diorganopolysiloxane as component (a) is represented by the average unit formula

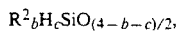

in which $R^2$ is an unsubstituted or substituted monovalent hydrocarbon group free from aliphatic unsaturation having 1 to 10 carbon atoms and the subscripts b and c are each a positive number with the proviso that $b+c$ is in the range from 1.0 to 3.0, and should have at least two or, preferably, at least three silicon-bonded hydrogen atoms per molecule. The group denoted by $R^2$ is exemplified by alkyl groups, e.g., methyl, ethyl, propyl and butyl groups, and aryl groups, e.g., phenyl and tolyl groups. The organohydrogenpolysiloxane should have an average degree of polymerization, preferably, not exceeding 300 and the molecular structure thereof can be straightly linear, branched or cyclic. The amount of the organohydrogenpolysiloxane compounded in the inventive rubber composition should be sufficient to provide from 0.5 to 3.0 moles of the silicon-bonded hydrogen atoms per mole of the silicon-bonded alkenyl groups in component (a).

Basically, the foamable silicone rubber composition can be prepared in step (A) by uniformly blending the above described essential components (a) to (e) each in a specified and weighed amount. It is, however, optional according to need that the composition is further admixed with various kinds of known additives conventionally used in silicone rubber compositions including dispersion aids, e.g., a low molecular-weight organopolysiloxane having a degree of polymerization not exceeding 100, silanolic hydroxy-containing organosilane compound, alkoxy group-containing organosilane compound and the like, heat resistance improvers such as iron oxide, ceric oxide, iron octoate and the like, coloring agents, e.g., pigments, flame retardant agents, e.g., platinum compounds, palladium compounds and the like, and so on.

When irradiated with microwaves according to the UHFV method in step (B), the foamable silicone rubber composition prepared in step (A) is readily foamed and cured into a cellular silicone rubber body as a consequence of the large heat evolution due to the efficient absorption of the energy of microwaves by the titanium dioxide powder contained in the composition. Therefore, the foamable silicone rubber composition can be used very advantageously in the manufacture of a continuous-length body of a cured and foamed silicone rubber using a continuous extrusion vulcanization machine consisting of a vent-type extruder machine, microwave irradiation oven, heating oven for post-curing and take-up winder by continuously extrusion-molding the composition followed by curing by the UHFV method and post-curing by passing through the oven to be finally wound up in a roll. Namely, the continuous-length body of the silicone rubber composition as extruded from the extruder machine and having a desired cross sectional configuration is introduced into the microwave oven to be irradiated there with microwaves at a frequency of 2450±50 MHz or 915±25 MHz so that the energy of the microwaves can be efficiently absorbed by the titanium dioxide powder contained in the composition to rapidly increase the temperature of the composition evenly throughout the whole cross section, for example, up to 160° C. at which temperature the blowing agent and the organic peroxide as the curing agent can be decomposed to produce a foaming gas or to effect crosslinking of the diorganopolysiloxane molecules.

It is optional, if so desired, that an auxiliary heating means is provided in the microwave oven with an object of providing a supplemental supply of heat to give a possibility of increasing the running velocity of the continuous-length body coming from the extruder. For example, hot air at an appropriate temperature can be circulated through the microwave oven in which the foamable silicone rubber composition is irradiated with microwaves so that heating of the silicone rubber composition is effected in two ways, one, with the microwaves and, the other, with the hot air. The temperature of the hot air should not be too high in order to avoid localized foaming and curing of the composition at and near the surface. In this regard, the temperature of the circulating hot air should be at about 130° C. or in the range from 100° to 220° C. Although foaming and curing of the silicone rubber composition can be almost complete when the composition in the continuous-length form comes out of the microwave oven, it is sometimes advantageous that the continuous-length body coming out of the microwave oven is further subjected to post-curing by normal-pressure hot-air vulcanization or fluidized-bed vulcanization in order to ensure complete curing of the composition, in addition to providing another advantageous effect, viz. the decomposition residues of the blowing and curing agents can be removed by dissipation, thereby contributing to the stabilization of the properties of the thus obtained foamed silicone rubber products.

The foamed and cured silicone rubber body obtained from the foamable silicone rubber composition prepared by the inventive method has excellent heat and cold resistance, weatherability and electric properties as well as low permanent compression set as the characteristics inherent in silicone rubbers in general since the diorganopolysiloxane as component (a) and the finely divided silica filler as component (b) need not be of special types and the titanium dioxide powder as component (c) added to the composition has no adverse effects on the properties of the cured silicone rubber. Moreover, the foamed and cured silicone rubber body has a very uniform and fine cellular structure throughout the body because evolution of the foaming gas is not localized but instead the gas is produced evenly throughout the body as a characteristic of the UHFV method. Accordingly, the inventive method for the preparation of a foamed silicone rubber composition can be utilized advantageously in the manufacture of any thick-walled continuous-length foamed silicone rubber bodies including gaskets and heat- and sound-insulators in buildings and transportation machines, e.g., automobiles, rubber rollers in office machines and the like.

In the following, the present invention is described in more detail by way of examples and comparative examples, in which the term of "parts" always refers to "parts by weight".

EXAMPLES 1 TO 5 AND COMPARATIVE EXAMPLES 1 TO 3

A base compound was prepared by uniformly blending, on a two-roller mill, 100 parts of a diorganopolysiloxane having a gum-like consistency with an average degree of polymerization of about 8000 and consisting of 99.825% by moles of dimethyl siloxane units, 0.150% by moles of methyl vinyl siloxane units and 0.025% by moles of dimethyl vinyl siloxy units, 3 parts of diphenyl silane diol as a dispersing aid, 4 parts of a dimethylpolysiloxane having a degree of polymerization of 10 and terminated at each molecular chain end with a silanolic hydroxy group and 40 parts of a fumed silica filler having a specific surface area of 200 $m^2/g$ (Aerosil 200, a product by Nippon Aerosil Co.) followed by a heat treatment at 150° C. for 4 hours to effect aging.

In each of Examples 1 to 5, 100 parts of the thus prepared base compound were uniformly blended, on a two-roller mill, with a titanium dioxide powder of one of three different types described below in an amount indicated in Table 1 below, 2.5 parts of azobisisobutyronitrile as a blowing agent, 2,4-dichlorobenzoyl peroxide in an amount indicated in Table 1 and 1.5 parts of dicumyl peroxide to give a foamable silicone rubber composition.

The thus prepared foamable silicone rubber composition was introduced into an extruder machine having a cylinder barrel of 40 mm diameter with a length:diameter ratio of 12 and equipped with an extrusion die of 10 mm inner diameter and 20 mm outer diameter and extruded therefrom at a temperature of 15° to 30° C. to give a continuous-length tubular body of 10 mm inner diameter and 20 mm outer diameter. The continuous-length tubular body was continuously introduced at a velocity of 2 meters per second into a microwave oven of 1.5 kilowatt output with two magnetrons having a microwave heating zone of 1.5 m length and irradiated there with microwaves at a frequency of 2450±50 MHz while hot air at 130° C. was circulated through the heating zone so that the tubular body coming out of the microwave oven had been expanded by foaming and cured into a completely cured silicone rubber tube having a fine and uniform cellular structure. Table 1 shows the ratio of expansion in % in each of these foamed and cured silicone rubber tubes.

The titanium dioxide powders used in the above described formulations included a rutile-type titanium dioxide powder having an average particle diameter of 0.3 $\mu$m (Tipaque R820, a product by Ishihara Sangyo Co.), referred to as type A in Table 1, anatase-type titanium dioxide powder having an average particle diameter of 0.2 $\mu$m (Tipaque A100, a product by Ishihara Sangyo Co.), referred to as type B in Table 1, and amorphous fumed titanium dioxide powder having an average particle diameter of 21 nm (P-25, a product by Nippon Aerosil Co.), referred to as type C in Table 1. It was noted that the foamed and cured silicone rubber tube obtained in Example 5 by using the type C titanium dioxide powder was somewhat more rigid than the other four silicone rubber tubes obtained in Examples 1 to 4 with the type A or B titanium dioxide.

For comparison, the same experimental procedure as in Example 1 was repeated in Comparative Example 1 excepting omission of the titanium dioxide powder compounded in the composition. The results were that the foamed silicone rubber tube obtained was cured only incompletely and the ratio of expansion by foaming was only 132%. The cellular structure thereof was found to be coarse with uneven distribution of cells.

For further comparison, the same procedure as in Comparative Example 1 was repeated in Comparative Example 2 except that the powder of the microwaves was off so as to attempt conducting curing of the silicone rubber tube only by heating with the hot air at 130° C. circulating in the heating zone. The results were that substantially no expansion by foaming could be noted and the composition remained in an almost uncured condition.

For still further comparison, the same experimental procedure as in Example 2 was repeated in Comparative Example 3 except that the power of the microwaves was off so as to attempt conducting curing of the silicone rubber tube only by heating with the hot air at 130° C. circulating in the microwave heating zone. The results were that substantially no foaming could be noted and the composition remained in an almost uncured condition.

TABLE 1

|  | Example No. | | | | |
| --- | --- | --- | --- | --- | --- |
|  | 1 | 2 | 3 | 4 | 5 |
| Titanium dioxide, type | A | A | A | B | C |
| Titanium dioxide, parts | 25 | 50 | 80 | 50 | 25 |
| 2,4-Dichlorobenzoyl peroxide, parts | 0.5 | 0.4 | 0.3 | 0.4 | 0.3 |
| Ratio of expansion, % | 303 | 315 | 334 | 314 | 235 |

What is claimed is:

1. A method for the preparation of a foamed and cured silicone rubber body which comprises the steps of:

(A) compounding, into a uniform composition, (a) 100 parts by weight of a diorganopolysiloxane represented by the average unit formula $$R_aSiO_{(4-a)/2},$$

in which R denotes an unsubstituted or substituted monovalent hydrocarbon group and the subscript a is a positive number in the range from 1.95 to 2.05, and having an average degree of polymerization in the range from 3,000 to 30,000, (b) from 10 to 300 parts by weight of a finely divided silica filler, (c) from 5 to 200 parts by weight of a powder of titanium dioxide having an average particle diameter not exceeding 30 μm, (d) from 1 to 20 parts by weight of a blowing agent, and (e) a curing agent in an amount sufficient to cure the composition; and (B) irradiating the composition prepared in step (A) above with microwaves at a frequency in the range from 900 to 5000 MHz.

2. The method for the preparation of a foamed and cured silicone rubber body as claimed in claim 1 wherein at least 98% by moles of the groups denoted by R in the diorganopolysiloxane are methyl groups.

3. The method for the preparation of a foamed and cured silicone rubber body as claimed in claim 1 wherein the finely divided silica filler has a specific surface area of at least 50 m²/g.

4. The method for the preparation of a foamed and cured silicone rubber body as claimed in claim 1 wherein the titanium dioxide powder has a crystalline structure.

5. The method for the preparation of a foamed and cured silicone rubber body as claimed in claim 1 wherein the titanium dioxide powder has an average particle diameter in the range from 0.1 to 10 μm.

6. The method for the preparation of a foamed and cured silicone rubber body as claimed in claim 1 wherein the amount of the titanium dioxide powder is in the range from 20 to 100 parts by weight per 100 parts by weight of the component (a).

7. The method for the preparation of a foamed and cured silicone rubber body as claimed in claim 1 wherein the blowing agent is an organic compound decomposable by heating to produce nitrogen or carbon dioxide gas.

8. The method for the preparation of a foamed and cured silicone rubber body as claimed in claim 1 wherein the amount of the blowing agent is in the range from 3 to 7 parts by weight per 100 parts by weight of component (a).

9. The method for the preparation of a foamed and cured silicone rubber body as claimed in claim 1 wherein the curing agent is an organic peroxide.

10. The method for the preparation of a foamed and cured silicone rubber body as claimed in claim 9 wherein the amount of the organic peroxide is in the range from 0.5 to 5 parts by weight per 100 parts by weight of component (a).

11. The method for the preparation of a foamed and cured silicone rubber body as claimed in claim 1 wherein the composition under irradiation with microwaves is heated simultaneously with hot air.

12. The method for the preparation of a foamed and cured silicone rubber body as claimed in claim 11 wherein the temperature of the hot air is in the range from 100° to 220° C.

* * * * *